(12) United States Patent
Pahle et al.

(10) Patent No.: US 8,739,946 B2
(45) Date of Patent: Jun. 3, 2014

(54) BRAKE DISC IMPLEMENTED AS A CASTING AND METHOD OF MAKING SAME

(75) Inventors: Wolfgang Pahle, Bad Wiessee (DE); Johann Baumgartner, Moosburg (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 198 days.

(21) Appl. No.: 13/344,346

(22) Filed: Jan. 5, 2012

(65) Prior Publication Data

US 2012/0175202 A1 Jul. 12, 2012

Related U.S. Application Data

(63) Continuation of application No. PCT/EP2010/059554, filed on Jul. 5, 2010.

(30) Foreign Application Priority Data

Jul. 6, 2009 (DE) .......................... 10 2009 032 007

(51) Int. Cl.
*F16D 65/12* (2006.01)

(52) U.S. Cl.
USPC .................................................... 188/218 XL

(58) Field of Classification Search
USPC .................. 188/218 A, 218 R, 218 XL, 18 A
See application file for complete search history.

(56) References Cited

U.S. PATENT DOCUMENTS

| | | | |
|---|---|---|---|
| 3,438,464 A | 4/1969 | Barrington | |
| 3,754,624 A * | 8/1973 | Eldred | 188/71.5 |
| 6,467,588 B1 * | 10/2002 | Baumgartner et al. | 188/218 XL |
| 6,811,005 B2 * | 11/2004 | Blewitt et al. | 188/73.38 |
| 7,467,694 B2 | 12/2008 | Botsch | |
| 8,061,785 B2 * | 11/2011 | Ilg | 301/105.1 |
| 2005/0173204 A1 * | 8/2005 | Baumgartner et al. | 188/71.1 |
| 2006/0175159 A1 * | 8/2006 | Botsch | 188/218 XL |
| 2007/0084685 A1 * | 4/2007 | Wimmer et al. | 188/218 XL |

FOREIGN PATENT DOCUMENTS

| | | |
|---|---|---|
| DE | 1 625 729 | 8/1970 |
| DE | 195 05 112 A1 | 8/1996 |
| DE | 198 43 399 A1 | 3/2000 |
| DE | 198 39 763 A1 | 5/2000 |
| DE | 101 59 799 A1 | 6/2003 |
| DE | 102 27 529 A1 | 1/2004 |
| DE | 10 2004 008 9 | 9/2005 |

(Continued)

OTHER PUBLICATIONS

International Preliminary Report on Patentability dated Jan. 19, 2012 (six (6) pages).

(Continued)

*Primary Examiner* — Christopher Schwartz
(74) *Attorney, Agent, or Firm* — Crowell & Moring LLP (57) ABSTRACT

A brake disc, in particular an internally ventilated brake disc, implemented as a casting includes a friction ring having an inner toothed rim and a neck materially separated therefrom and retained against rotation by an outer toothed rim. The neck is connecting to a wheel hub. Cast-in sliding elements are provided between the teeth to allow for a radial displacement of the friction ring relative to the neck. Each sliding element has a U-shape, the opposite legs thereof being disposed between the radially and axially oriented side faces of the associated teeth facing each other, wherein a web connecting the legs extends radially.

20 Claims, 13 Drawing Sheets

(56) References Cited

FOREIGN PATENT DOCUMENTS

| | | |
|---|---|---|
| DE | 10 2007 018 6 | 10/2008 |
| DE | 10 2007 054 3 | 5/2009 |
| EP | 1 972 823 A1 | 9/2008 |
| EP | 1 983 210 B1 | 8/2011 |
| EP | 2 210 011 B1 | 11/2011 |
| WO | WO 02/101259 A1 | 12/2002 |
| WO | WO 2009/045162 A1 | 4/2009 |

OTHER PUBLICATIONS

German Office Action dated Mar. 26, 2010 including English-language translation (Eleven (11) pages).
German Office Action dated Jun. 7, 2011 including English-language translation (Ten (10) pages).
International Search Report dated Sep. 15, 2010 including English-language translation (Four (4) pages).

* cited by examiner

BRAKE DISC IMPLEMENTED AS A CASTING AND METHOD OF MAKING SAME

CROSS-REFERENCE TO RELATED APPLICATIONS

This application is a continuation of PCT International Application No. PCT/EP2010/059554, filed Jul. 5, 2010, which claims priority under 35 U.S.C. §119 from German Patent Application No. DE 10 2009 032 007.5, filed Jul. 6, 2009, the entire disclosures of which are herein expressly incorporated by reference.

This application contains subject matter related to U.S. application Ser. No. 13/344,336, entitled "Brake Drum Implemented as a Casting and Method of Making Same" filed on even date herewith.

BACKGROUND AND SUMMARY OF THE INVENTION

The invention relates to a brake disc implemented as a casting.

Brake discs of this type, which are used both in automobiles and in commercial vehicles, are commonly produced from gray cast iron, with the friction ring being materially separated from the neck of the brake disc such that the friction ring can move radially in relation to the neck. This avoids stresses that may occur as a result of the thermally induced radial expansion of the friction ring, with resultant heat cracks.

Brake discs which are produced without sliding elements which separate the friction ring and the neck are also known, in which case the neck is commonly firstly cast and the connection region thereof with the friction ring is provided with a so-called mediator, such that the subsequently cast-on friction ring does not enter into a metallic bond with the neck.

Although this makes different materials pairings possible, the production of such a brake disc is relatively expensive and is therefore effectively unacceptable for the production of a product in series production, as represented by such a brake disc.

Brake discs of this type are known, for example, from EP 1 972 823 A1 or DE 198 43 399 A1.

A further brake disc, also known as a cast brake disc, is disclosed in DE 102 27 529 A1. This document proposes forming the sliding elements as sleeves, of which an inner sleeve is connected fixedly to a pin of the neck with a circular cross section and an outer sleeve guided axially displaceably thereon is fixedly connected to the friction ring, wherein the sliding element, i.e. both sleeves, are concomitantly cast in when the neck and the friction ring are being produced in one piece by casting.

In this case, however, the diameter of the pin and therefore the absorption of the torques which arise during braking are limited to a relatively great extent, since they depend on the thickness of the friction ring or on the associated width of the cooling ducts formed. In order to establish a sufficiently stable connection between the friction ring and the neck, an appropriately high number of connection elements, i.e. of pins and sleeves, are therefore required. These connection elements are formed by the toothed rings within the context of the invention.

Of course, this is only possible with an accordingly high manufacturing outlay and material use, but this is an obstacle to the constant requirement for minimization of the production costs.

DE 195 05 112 A1 discloses and describes a brake disc which, rather than being internally ventilated, has a solid friction ring which is materially separated from the neck by sliding elements, which are formed cohesively from a meandering sheet metal strip. However, the function of this design is limited insofar as it is not suitable for the use of an internally ventilated brake disc.

The invention is based on the object of further developing a brake disc of the above-identified type such that its production is easier and thus more cost-effective, its service life is increased, and its weight is minimized.

This and other objects are achieved by a brake disc, in particular an internally ventilated brake disc, implemented as a casting, comprising a friction ring, which has an inner toothed ring, and a neck, which is materially separated therefrom and is retained such that it cannot rotate by an outer toothed ring which engages into the inner toothed ring, for connection to a wheel hub, wherein cast-in sliding elements are provided between the teeth for radial movement of the friction ring in relation to the neck. Each sliding element has a U-shape, the opposing legs of which are arranged between the radially and axially oriented side faces of the associated teeth which face toward one another. A web of the U-shape, which connects the legs, extends radially.

To begin with, such a novel brake disc is distinguished by its extraordinarily simple production. Thus, the sliding elements, which are formed for example from a sheet metal strip and preferably consist of stainless steel with a higher melting point than that of the cast material of the friction ring and of the neck, can be inserted into the casting mold, to be precise into the casting cores for ventilation ducts of the friction ring.

During the subsequent casting of the brake disc, the sliding elements are concomitantly cast into the brake disc from both outer sides, it being possible in the case of an appropriate design for the friction ring and the neck to be cast in one-piece.

During subsequent material-removing machining, as has been required until now, material is removed from the neck by turning in the radial direction until the included sliding elements are exposed.

As a result, both the outer toothed ring of the neck and the inner toothed ring of the friction ring are formed, and are therefore no longer materially connected to one another. Two separate components which are movable radially with respect to one another are therefore produced by the turning operation.

Appropriate shaping of the sliding elements provides a positive connection between the neck and the friction ring which acts in the axial direction, and for this purpose radially extending beads can be provided in the sliding elements. For example, these radially extending beads permit the radial movement of the friction ring with respect to the neck of 1-2 mm but preclude axial movement to such an extent that this lies merely in a range <0.1 mm.

A further aspect of the invention provides for the sliding element to be formed with two plies, wherein one of the two plies which lie one against the other is held positively on the friction ring and the other ply is held positively on the neck. In this case, too, the configuration is selected such that the friction ring can move radially without obstruction, in which case the planar faces of the two plies which lie against one another then shift with respect to one another.

If the sliding elements are formed with one ply, it is expedient for there to be a coating on one side, with which a connection between the sliding element and the associated casting is prevented.

Each sliding element has a U-shaped outline and surrounds a tooth of the inner toothed ring on three sides, the web which connects the legs oriented in parallel being embedded in the neck and extending radially.

In order to provide the friction ring with the possibility to expand radially in any case, i.e. even in the event of possible warpage of the elements during casting, the legs of the U-shaped sliding element are arranged at an angle with respect to one another in the radial direction, such that a tapered portion or inversely a widened portion is produced in the direction of the central axis. It is preferable for the legs to be inclined by an angle in the range of 10-30° with respect to one another.

Before forming, the sliding element is present in the form of a sheet metal strip in which a wedge-shaped notch in the sense of a cutout is made in that region which forms the web during the subsequent forming, the wedge angle of said cutout corresponding to the angle at which the two legs of the sliding element run with respect to one another. This achieves optimization of the material use, since the blank used can be formed from a rectangular strip, for example by cutting strip material to length.

For the rest, merely compressive forces which depend on braking torques are to be absorbed or transmitted by the sliding elements, in contrast to those according to the prior art, which are subjected to bending, pressure and/or tension.

Other objects, advantages and novel features of the present invention will become apparent from the following detailed description of one or more preferred embodiments when considered in conjunction with the accompanying drawings.

DETAILED DESCRIPTION OF THE DRAWINGS

FIGS. 1 to 8 show an internally ventilated brake disc implemented as a casting.

This brake disc has a friction ring 1 with two friction bodies 3 which are arranged in parallel and spaced apart with respect to one another and are connected to one another by webs 5, to form cooling ducts 4.

A neck 2 is materially separated from and retained on the friction ring 1 such that it cannot rotate. The neck 2 can be connected to a wheel hub (not shown), for example by bolts or screws.

The material separation between the friction ring 1 and the neck 2 makes it possible for them to move in relation to one another in the radial direction, for which purpose provision is made of cast-in sliding elements 6. The sliding elements 6 consist of a material having a higher melting point than the friction ring 1 and the neck 2. In this respect, the sliding elements 6 can consist of a metallic or else of a non-metallic material, for example ceramic.

The friction ring 1 has an inner toothed ring 7, with teeth 8, which engages into an outer toothed ring 9, with teeth 10 of the neck 2. The sliding elements 6 are arranged between the radial side faces of the teeth 8, 10 which face toward one another.

Figure 1:
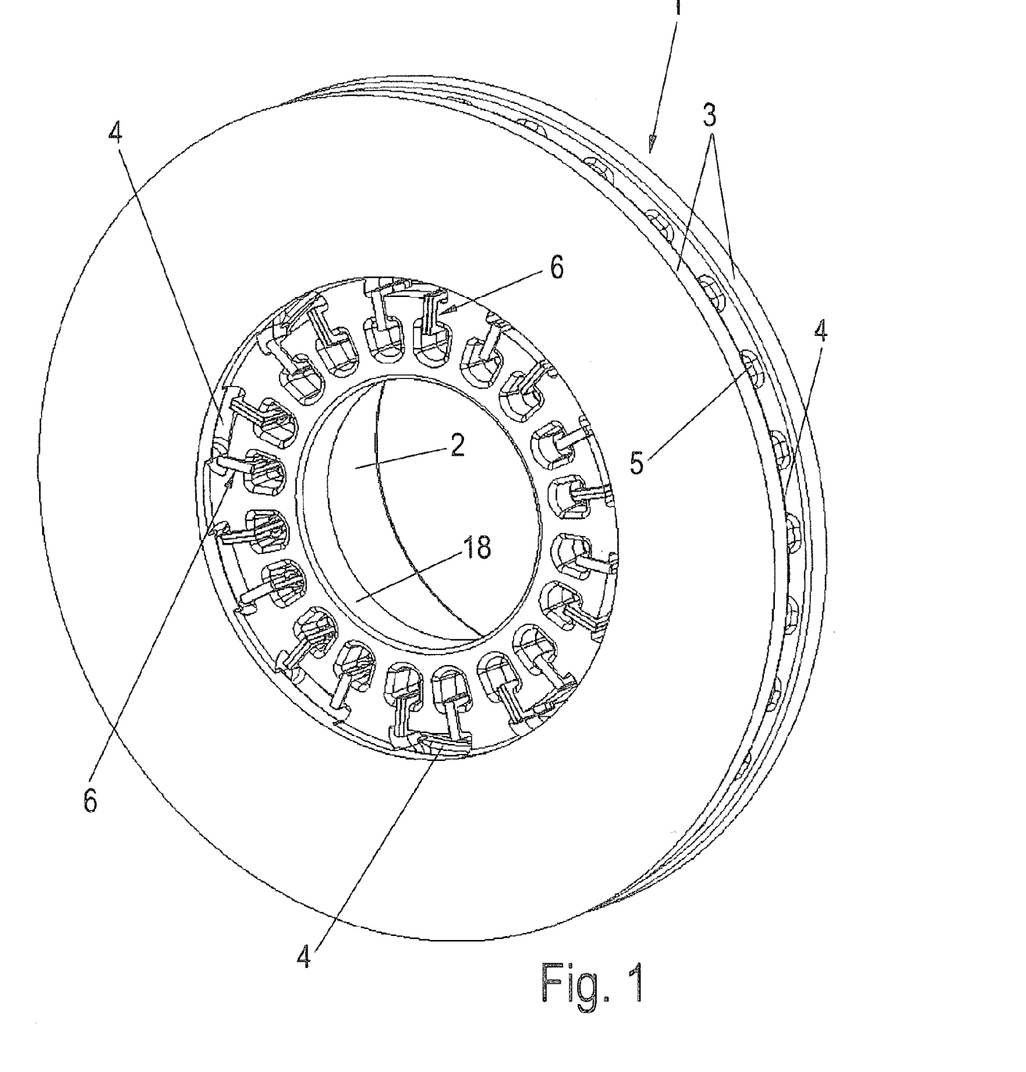
FIGS. 1 to 3 each show a brake disc implemented as a casting as a blank before final machining, in different views.
Figure 2:
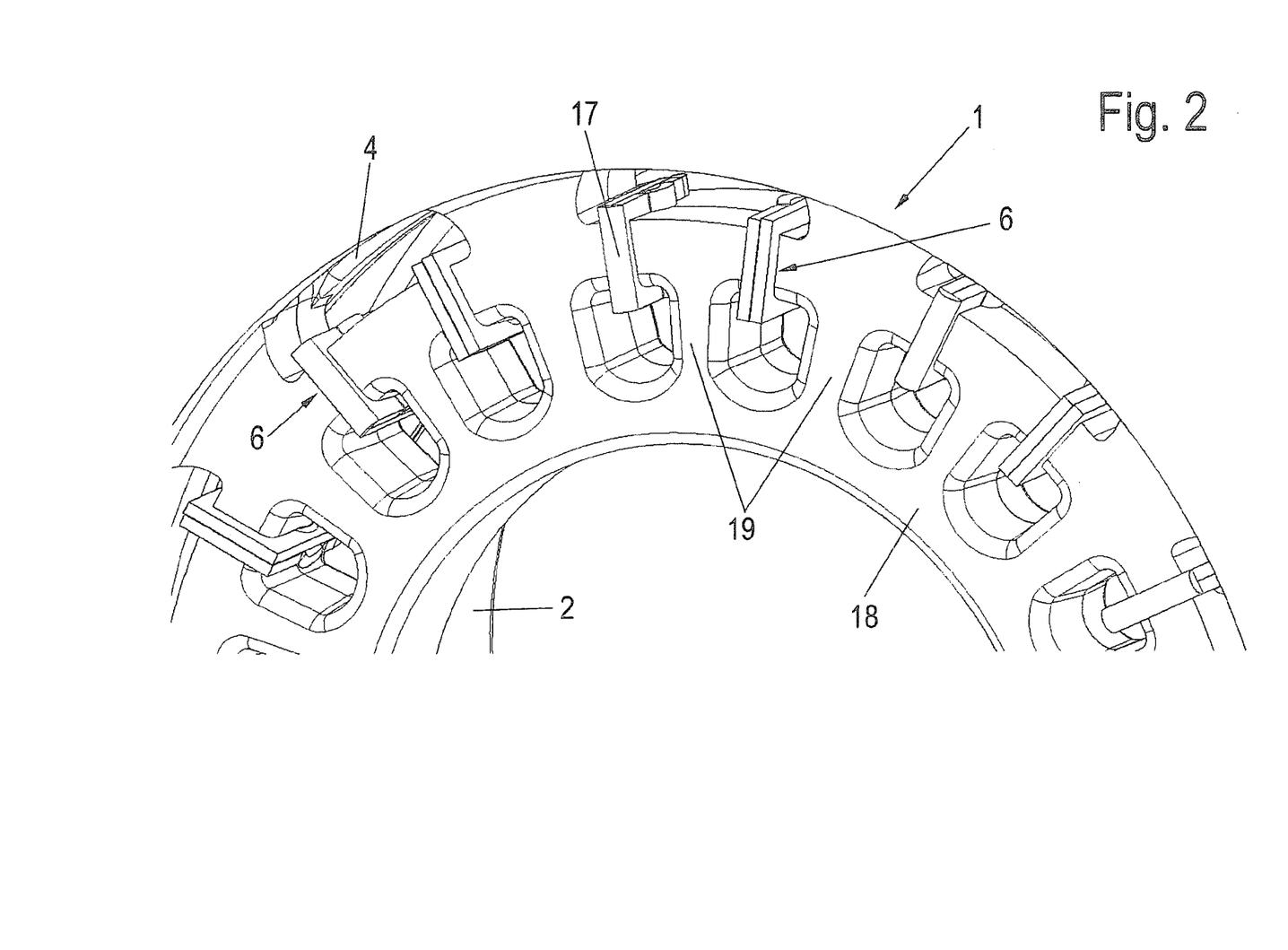
Figure 3:
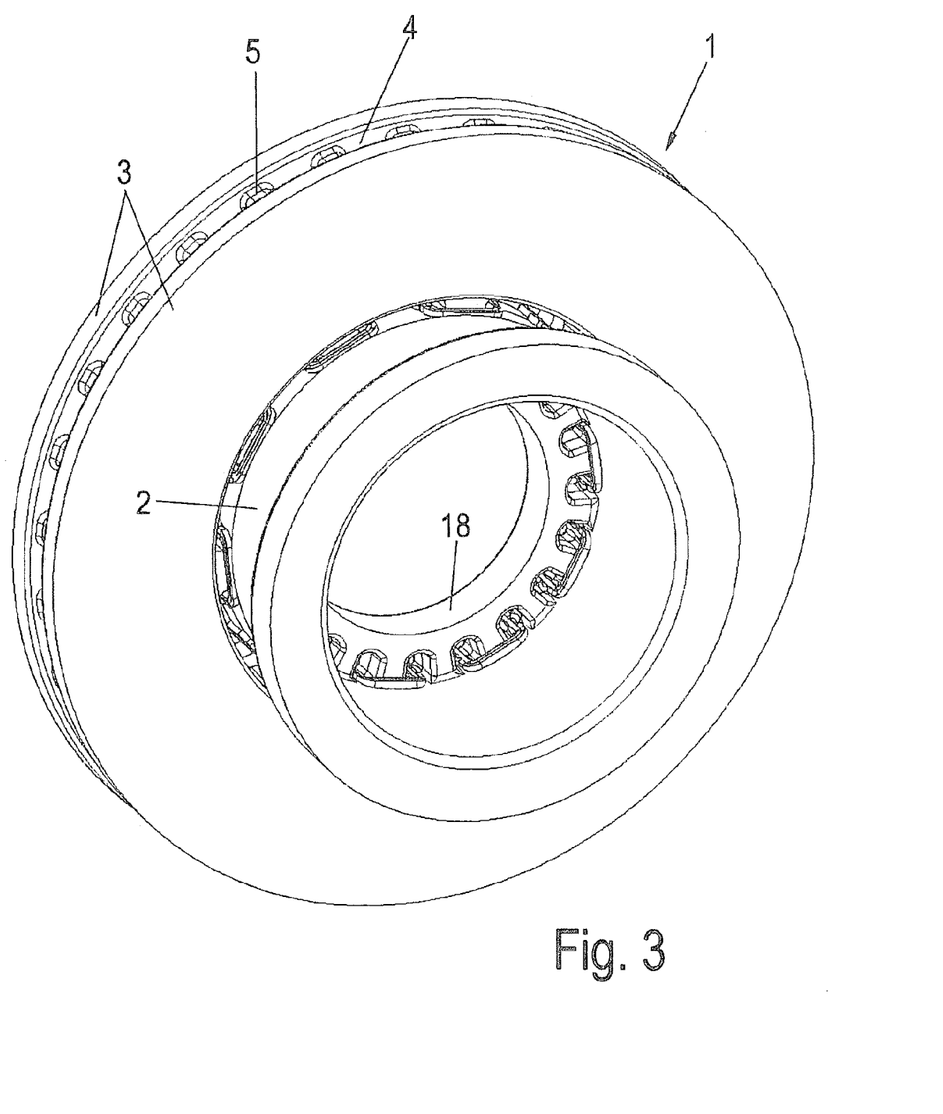
Figure 4:
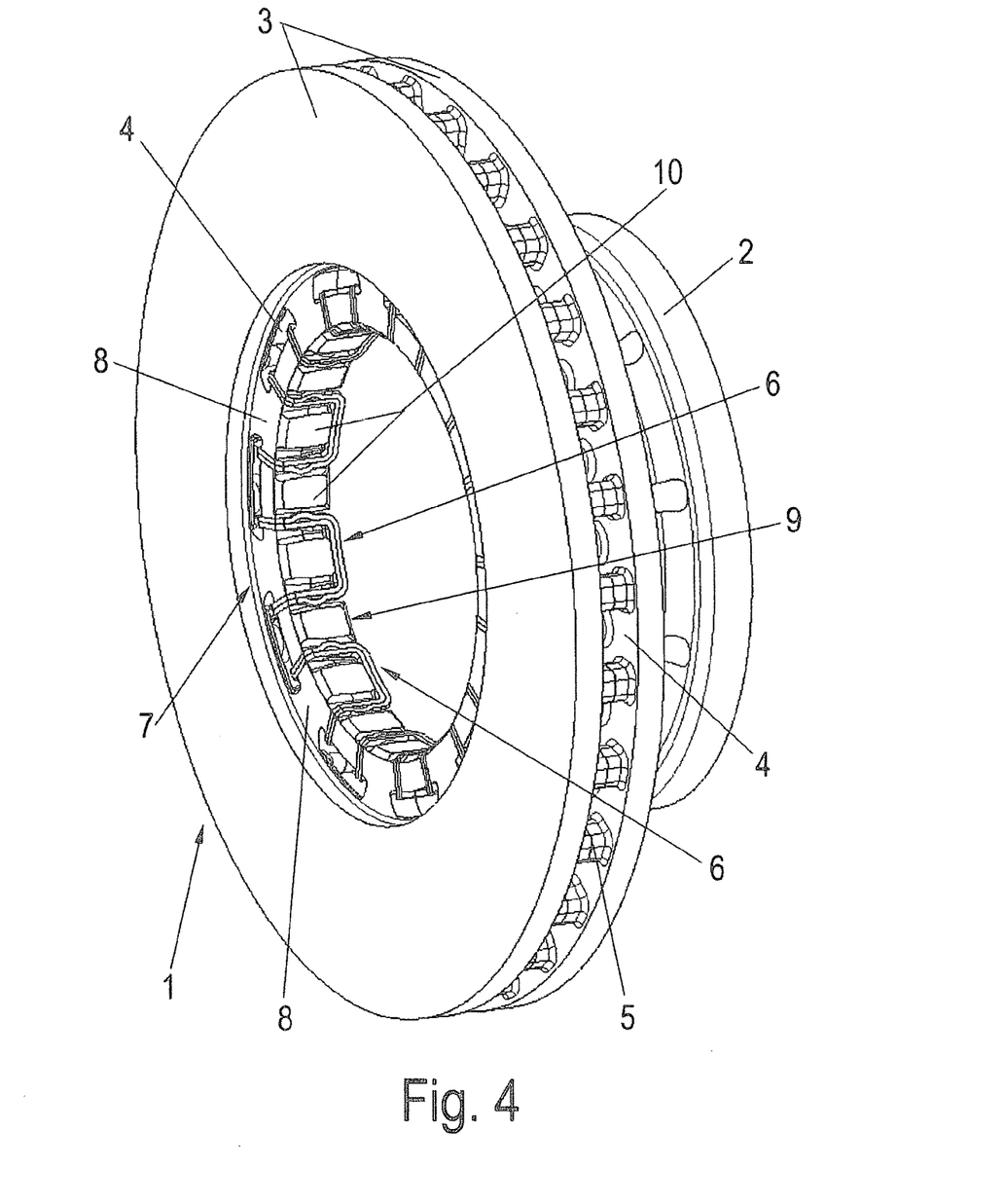
FIG. 4 shows the finished brake disc in a perspective view.
Figure 5:
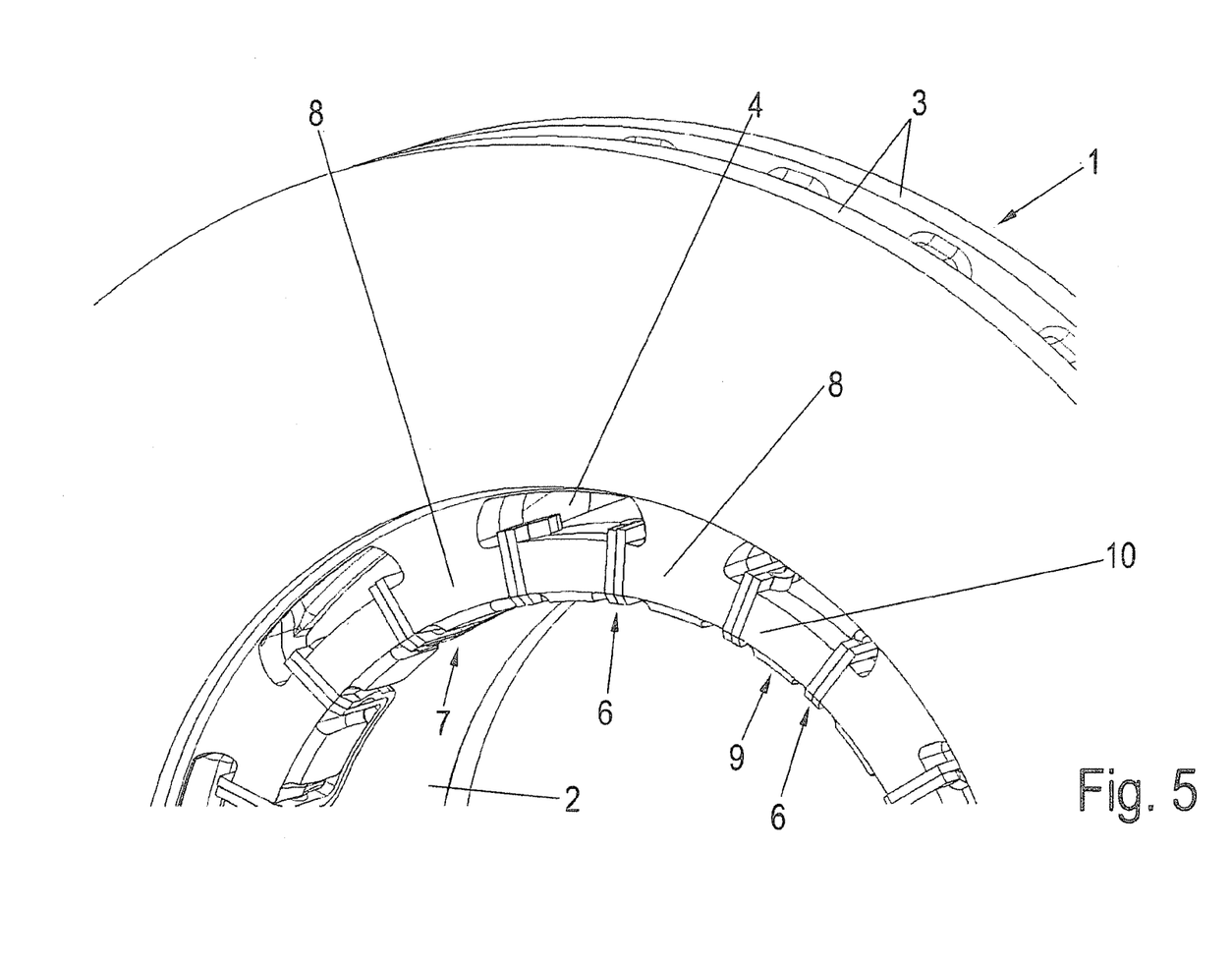
FIG. 5 shows an enlarged detail of the brake disc in a front view.

FIGS. 1 to 3 show the already cast, but not yet finished brake disc, in the case of which the neck 2 has a concentric, radially inwardly oriented cast-on collar 18, which is connected via connection webs 19 to the friction ring 1, which, for the rest, is formed mirror-symmetrically in each center plane.

To produce the brake disc, the sliding elements 6, which are arranged circumferentially with the same angular distance and are formed, for example, as shaped sheet metal parts with two plies, are each partially embedded in the casting core for the associated ventilation duct 4 of the brake disc. During the subsequent casting of the brake disc, the sliding element is concomitantly cast into the brake disc from both outer sides. The friction ring 1 and the neck 2 can thereby be cast or formed in one-piece.

FIGS. 4-8 show the finished brake disc, in the case of which the collar 18 and the connection webs 19 of the blank shown in FIGS. 1-3 have been removed completely by chip-forming machining, such that the embodiment shown in FIGS. 4-8 is obtained, in which the teeth 8, 10 terminate flush with the sliding elements 6 on the inner side.

Figure 9A:
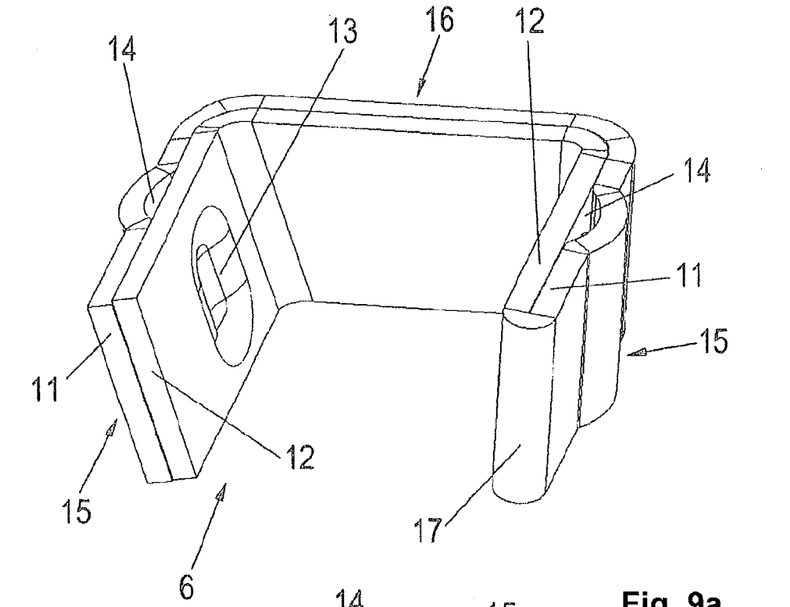
FIGS. 9a and 9b show details of the brake disc sliding element in two different views.
Figure 9B:
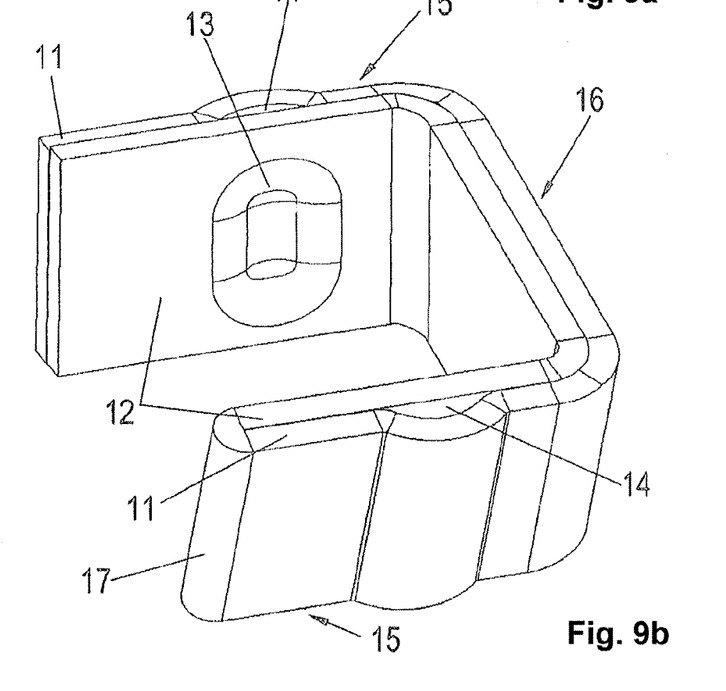

A sliding element 6 of this type is also shown in detail in FIGS. 9a and 9b. It can be seen in FIGS. 9a and 9b that the sliding element, as mentioned, is in the form of a U-shaped shaped sheet metal part with two plies, with an outer ply 11 and an inner ply 12, which lie largely areally against one another and in each case form legs 15 which are oriented in parallel and are connected to one another by a web 16 likewise having two plies.

FIGS. 9a and 9b show the sliding element 6 as a blank, in the form in which it is inserted into the casting mold. It can be seen that here it has a bending edge 17 which connects the outer and inner plies 11, 12 of one leg to one another and is likewise removed by chip-forming machining during the machining which follows casting, and therefore during operation the outer and inner plies 11, 12 are displaceable radially with respect to one another.

For securing the neck 2 axially with respect to the friction ring 1, the two inner plies 12 have outwardly turned protrusions 13 which engage into radially oriented beads 14 of the outer ply 11, which thereby form a radial guide, where the embossed formation created by the beads 14 forms a positive connection with the neck 2 in the radial direction of the tooth 10, while the impression of the protrusion 13 forms such a positive connection with the tooth 8 of the inner ring 7.

Figure 6:
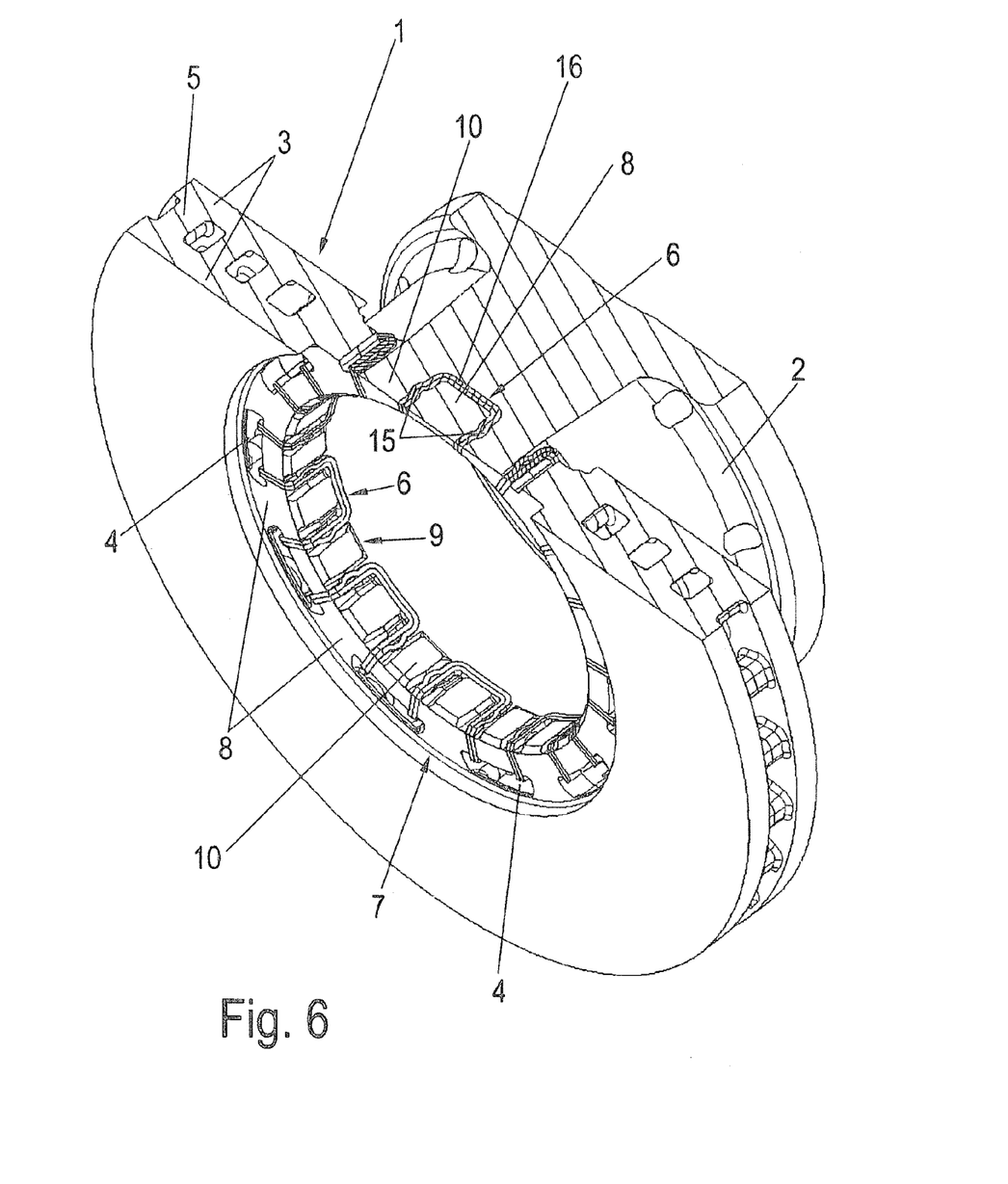
FIG. 6 shows the brake disc partially cut lengthwise, likewise in a diagrammatic illustration.
Figure 7:
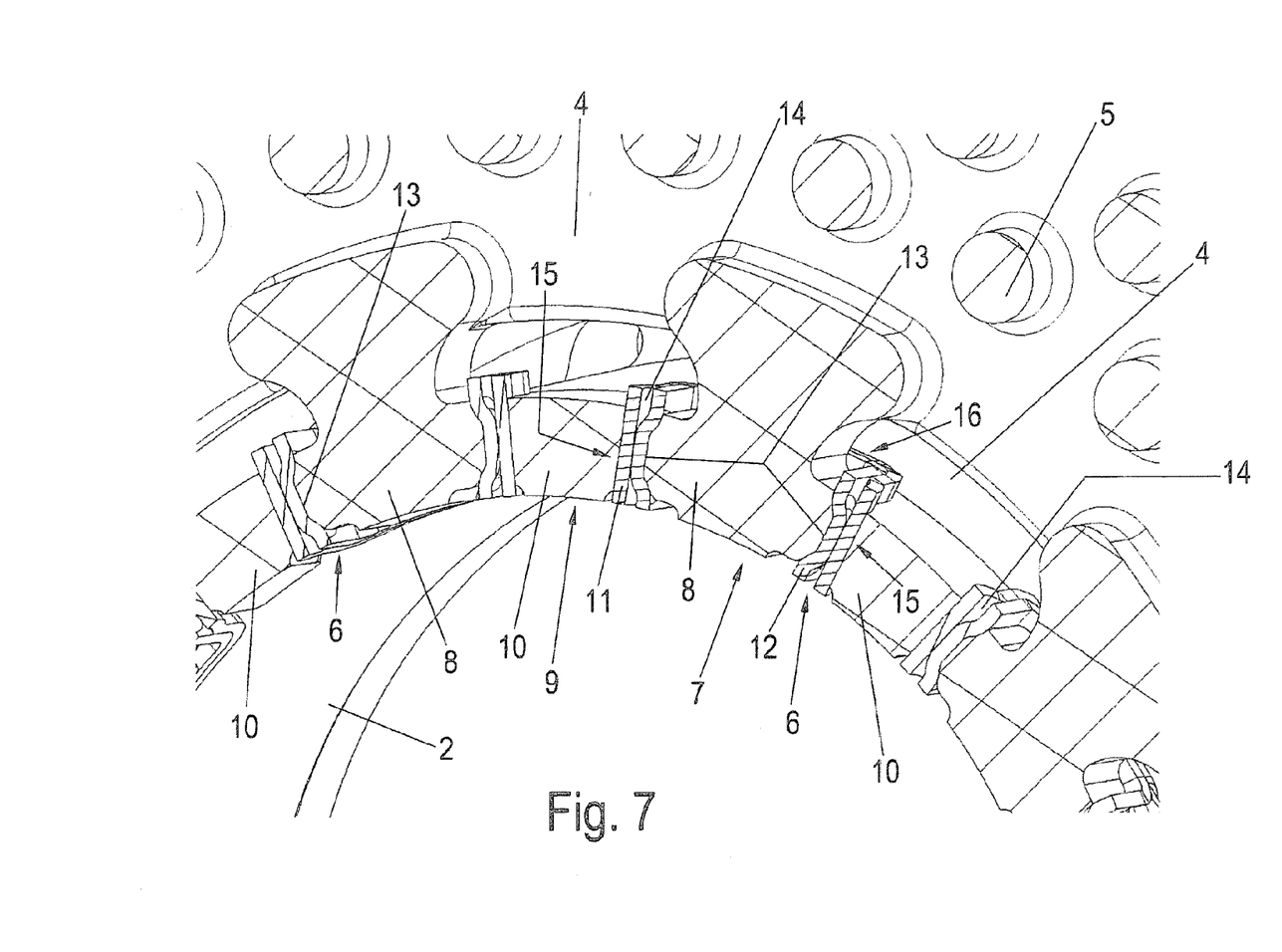
FIG. 7 shows an enlarged detail of part of the brake disc in a cut-away front view.
Figure 8:
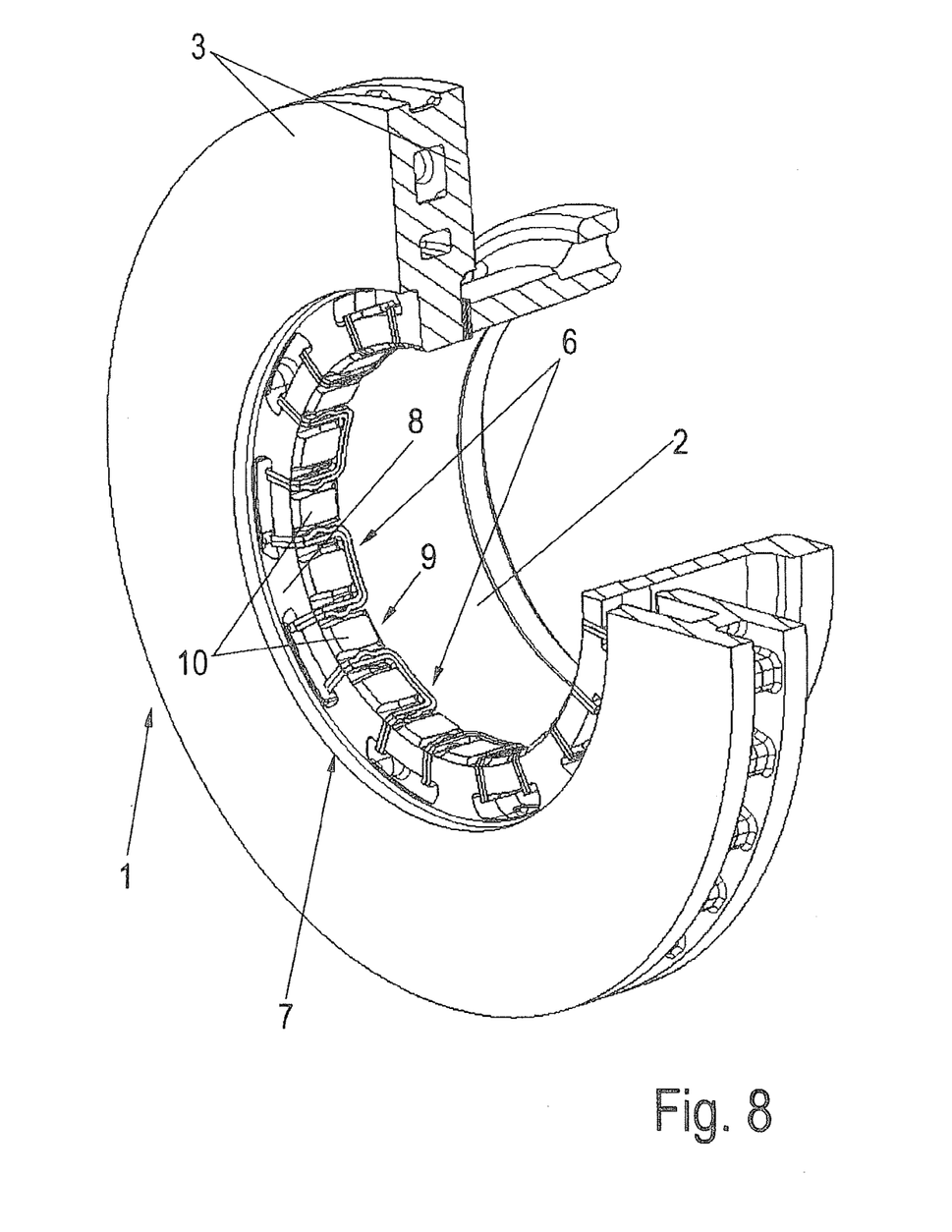
FIG. 8 shows the brake disc with a partial section in a perspective illustration.

As FIG. 6, in particular, very clearly shows, the web 16, just like the legs 15, separates the tooth 8 of the inner ring 7 from the adjacent teeth 10 of the outer ring 9, such that there is no material connection between the neck 2 and the friction ring 1.

Figures 10, 11, 12:
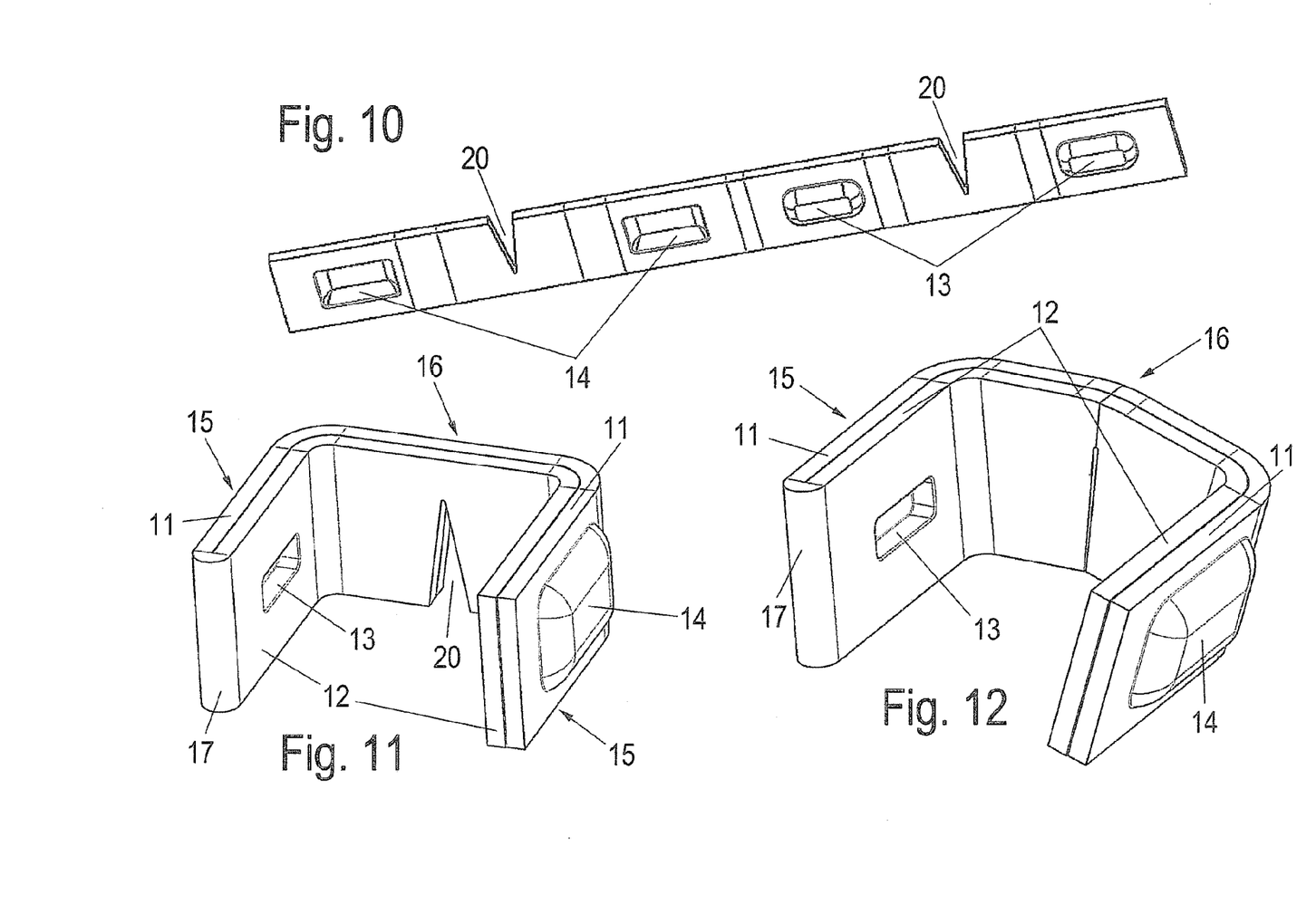
FIG. 10 shows a blank of the sliding element before forming in a perspective view.
FIGS. 11 and 12 show the blank after forming in different forming steps.

FIG. 10 shows the sliding element 6 as a partially machined blank which consists of a sheet metal strip into which the protrusions 13 and beads 14 have already been impressed.

Wedge-shaped notches 20 have been introduced into those regions which form the two-ply web 16 of the sliding element 6 during the subsequent forming.

FIGS. 11 and 12 each show a further manufacturing step for producing the sliding element 6, where in FIG. 11 the sheet metal strip shown in FIG. 10 has been folded such as to form the two-ply U shape.

The sliding element to be inserted into the casting mold can be seen in FIG. 12, said sliding element being deformed in accordance with the notch 20 to such an extent as to produce an inclined position of the legs 15 at an angle of approximately 10-30° with respect to one another.

Figure 13:
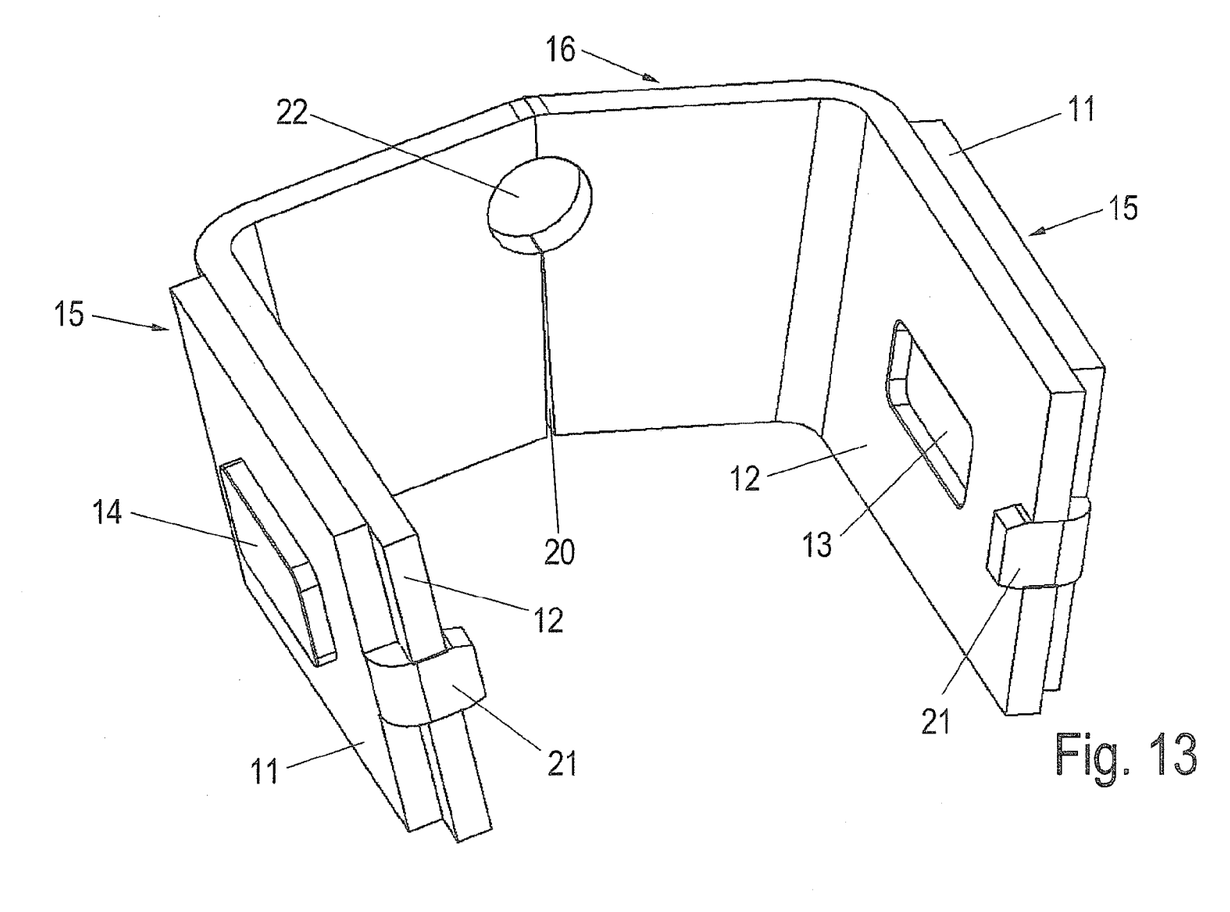
FIG. 13 shows a further exemplary embodiment of a sliding element in a perspective view.
Figure 14:
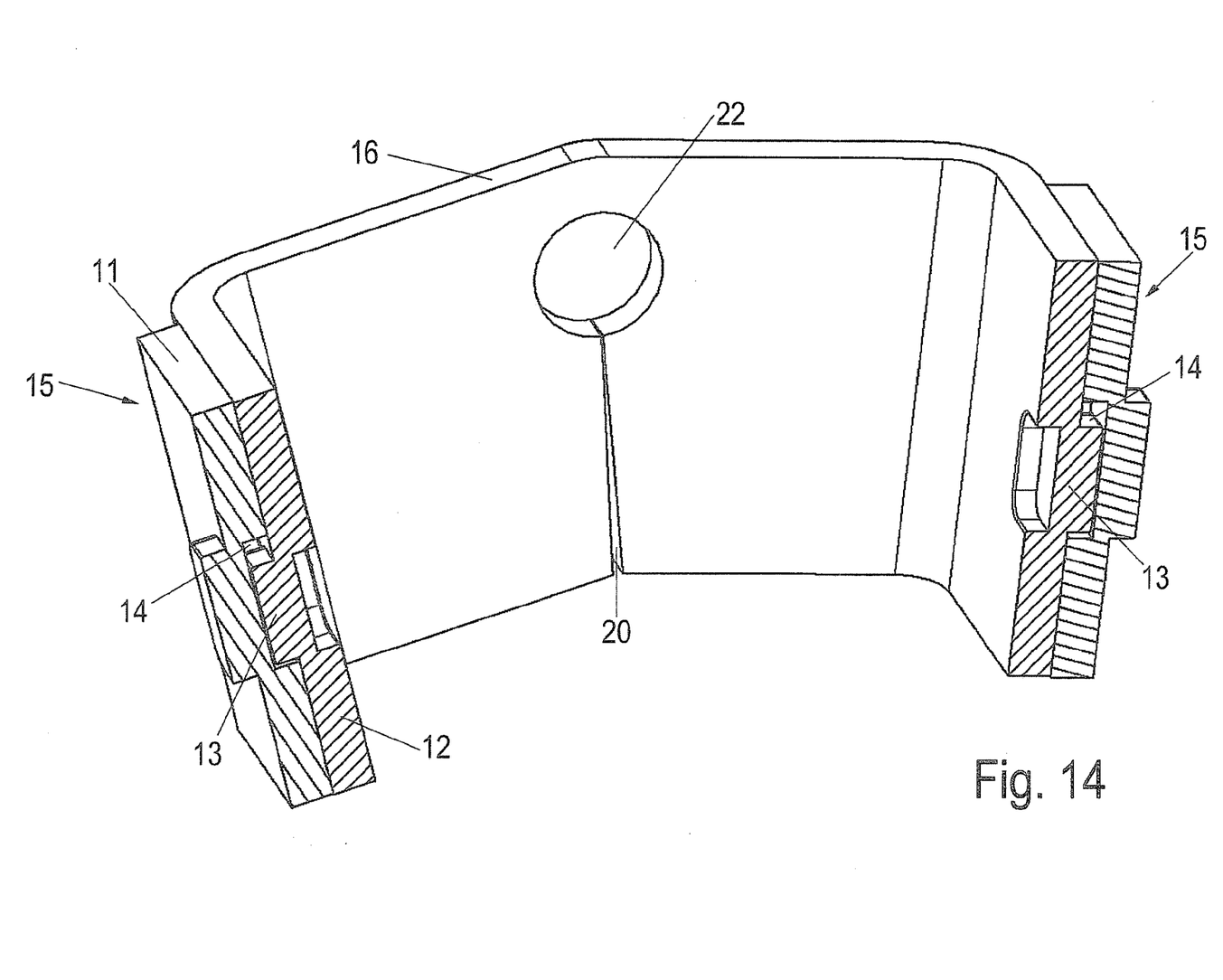
FIG. 14 shows the sliding element shown in FIG. 13 in a cut-away side view.
Figure 15:
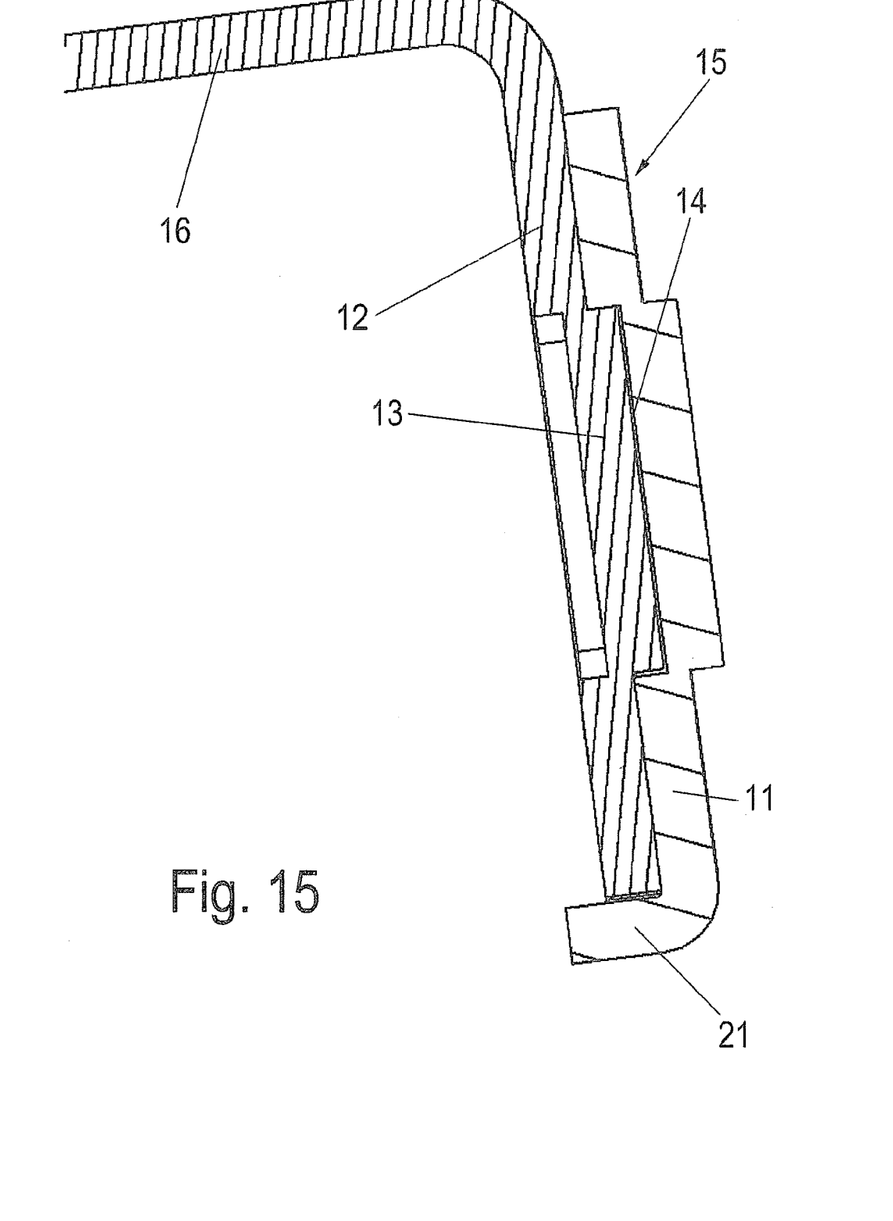
FIG. 15 shows a partial section of the sliding element shown in FIG. 13 in a cut-away plan view.

FIGS. 13-15 show a further exemplary embodiment of the sliding element 6, in which only the two legs 15 are formed with two plies.

The sliding element shown corresponds to the state in which it is inserted into the casting mold. To fix the outer ply 11, a retaining tongue 21 is integrally formed thereon and engages frictionally and/or positively into an appropriate recess provided on the free end face of the inner ply 12 which lies opposite the web 16.

During the final chip-forming machining which follows the casting of the brake disc, the retaining tongues 21 are removed, as already described in relation to the bending edge 17.

To make it easier to form the inclined position of the legs 15, the notch 20 opens out into a cutout 22.

In the sliding element 6 shown in FIG. 13, but also in the variant shown in FIG. 12, the bead 14 is introduced in the radial direction only in certain regions and in this case is greater than the protrusion 13 lying in the inner ply 12, to be precise approximately 1-2 mm. The radial relative movement between the friction ring and the neck is thereby limited. This can be seen particularly clearly in FIG. 14.

In the axial direction, by contrast, such a relative movement is not desirable, and therefore the protrusion 13 of the inner ply 12 lies substantially with a precise fit in the bead 14, preferably with a clearance <0.1 mm. This in this respect axial positive engagement can be seen in FIG. 15.

TABLE OF REFERENCE NUMERALS

1 Friction ring
2 Neck
3 Friction body
4 Air duct
5 Web
6 Sliding element
7 Inner toothed ring
8 Tooth
9 Outer toothed ring
10 Tooth
11 Outer ply
12 Inner ply
13 Protrusion
14 Bead
15 Leg
16 Web
17 Bending edge
18 Collar
19 Connection web
20 Notch
21 Retaining tongue
22 Cutout The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A cast brake disc, comprising:
    a friction ring having an inner toothed ring;
    a neck having an outer toothed ring, the neck being materially separate from the friction ring and retained against rotation by engagement of the outer toothed ring into the inner toothed ring of the friction ring; and
    cast-in sliding elements operatively arranged between the teeth to allow for radial movement of the friction ring relative to the neck, each sliding element having a U-shape whose opposing legs are arranged between radially and axially oriented extending side faces of friction ring and neck teeth facing toward one another, and a web of the U-shape connecting the legs extending radially.

2. The brake disc according to claim 1, wherein the sliding elements are shaped sheet metal parts.

3. The brake disc according to claim 2, wherein the sliding elements are formed with two plies, one ply being an outer ply and the other ply being an inner ply.

4. The brake disc according to claim 3, wherein the outer ply and the inner ply of respectively opposing legs have a positive locking mechanism to secure against axial displacement; and
    wherein the inner plies and the outer plies are movable radially with respect to one another.

5. The brake disc according to claim 4, wherein the radial moveability of the inner plies and the outer plies with respect to one another has a limited extent.

6. The brake disc according to claim 3, wherein the sliding elements are formed from a rectangular sheet metal strip.

7. The brake disc according to claim 3, wherein the outer ply is positively connected to an abutting tooth and the inner ply is positively connected to an abutting tooth.

8. The brake disc according to claim 1, wherein the brake disc is an internally ventilated brake disc having ventilation ducts operatively arranged between opposing friction surfaces of the friction ring.

9. The brake disc according to claim 8, wherein the sliding elements protrude into an inlet region of a cooling duct for the internally ventilated brake disc.

10. The brake disc according to claim 1, wherein the sliding elements are formed from a rectangular sheet metal strip.

11. The brake disc according to claim 10, wherein a wedge-shaped notch is arranged in a region of the web before forming the sheet metal strip into the U-shape.

12. The brake disc according to claim 1, wherein the sliding elements are formed with one ply, said ply being held positively on one side of one of the teeth.

13. The brake disc according to claim 12, wherein the one ply has a release coating on a contact surface lying opposite a side of the sliding element that faces the one of the teeth on which said ply is positively held.

14. The brake disc according to claim 1, wherein each sliding element encompasses an associated tooth of the inner toothed ring.

15. The brake disc according to claim 3, wherein the outer ply of a respective leg is connected at least one of frictionally and positively to an inner ply of the respective leg as a separate sheet metal part.

16. The brake disc according to claim 1, wherein the inner toothed ring, the outer toothed ring, and the sliding elements extend flush with one another circumferentially on an inner side of the brake disc.

17. A method of making a brake disc, the method comprising the acts of:
- arranging sliding elements in a casting mold for the brake disc having a friction ring with an inner toothed ring and a neck with an outer toothed ring, the inner and outer toothed rings engaging one another with the sliding elements being interposed therebetween, the sliding elements having a U-shape with the opposing legs being interposed between the teeth and a web connecting the legs extending circumferentially so as to encompass an inner tooth of the friction ring;
- casting the brake disc in one-piece so as to enclose with an inner collar a radially inner side of the sliding elements; and
- machining away the inner-collar to expose the radially inner side of the sliding elements such that the friction ring and neck are materially separated from one another via the sliding elements.

18. The method according to claim 17, further comprising the act of:
- forming the sliding elements as sheet metal parts having two plies, an inner ply of each leg engaging with an outer ply of each leg to allow for a defined amount of radial movement and a defined amount of axial movement.

19. The method according to claim 18, wherein the two ply sliding elements are formed from a single ply sheet metal part that is folded over upon itself at a bending edge, the bending edge being removed during the machining act to allow for the radial movement between the inner and outer plies.

20. The method according to claim 18, wherein the outer ply of each leg is a separate sheet metal part that has a positive connection to the inner ply, the positive connection being machined away during the machining act to allow for the radial movement.

\* \* \* \* \*